March 17, 1925.
W. L. MARTIN
SOLDERING POT
Filed March 30, 1923
1,530,274
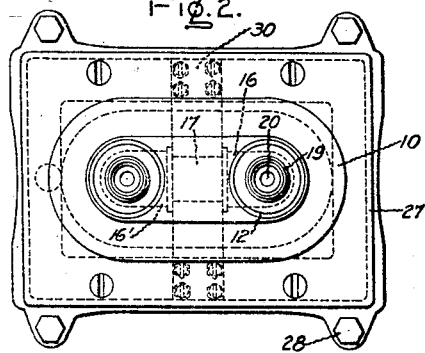
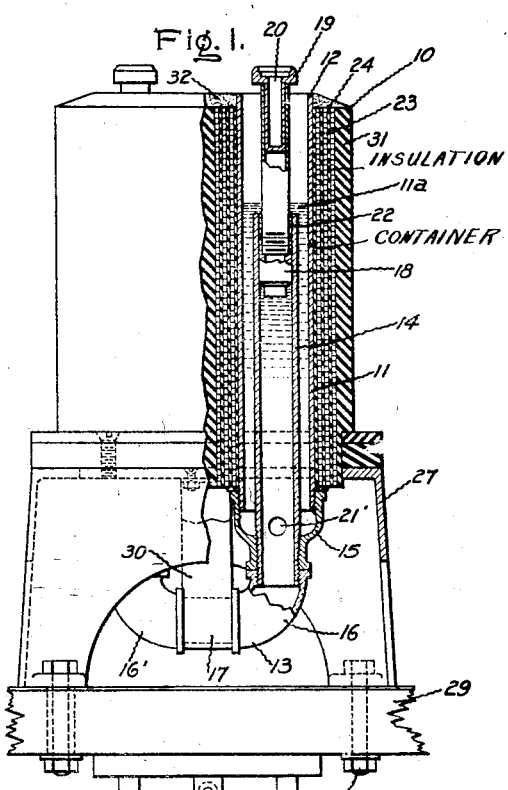
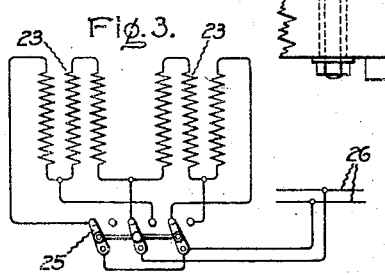
Inventor:
Wendell L. Martin,
by
His Attorney.

Patented Mar. 17, 1925.

1,530,274

UNITED STATES PATENT OFFICE.

WENDELL L. MARTIN, OF CLEVELAND, OHIO, ASSIGNOR TO GENERAL ELECTRIC COMPANY, A CORPORATION OF NEW YORK.

SOLDERING POT.

Application filed March 30, 1923. Serial No. 628,893.

*To all whom it may concern:*

Be it known that I, WENDELL L. MARTIN, a citizen of the United States, residing at Cleveland, in the county of Cuyahoga, State of Ohio, have invented certain new and useful Improvements in Soldering Pots, of which the following is a specification.

My invention relates to soldering pots, such for instance as electrically heated soldering pots, and has for its object the provision of a simple, reliable and efficient device of this character, in which provision is made whereby the solder may be applied only to the desired parts of the article to be soldered.

In the soldering of various articles it has been the practice to immerse the article to the desired extent in a bath of molten solder. With this method the solder is often applied to various parts of the article where it is unnecessary or undesirable. This is particularly true in the soldering of commutators for small electric motors. These commutators are usually soldered after being mounted on the rotor shaft so that the end of the shaft must be immersed in a soldering bath in order to apply the solder to the commutator.

In carrying out my invention in one form as applied to the soldering of commutators for small motors, I provide a floating shield in the soldering bath which closely fits the end of the shaft and parts of the commutator to which it is not desired to apply the solder. By means of my invention the end of the shaft may be inserted in the shield and the whole depressed in the soldering bath until the solder comes in contact with the parts of the commutator to be soldered. My invention also comprehends an improved form of electrically heated soldering pot in which the solder is heated by currents induced in both the container and the solder.

For a more complete understanding of my invention reference should be had to the accompanying drawing in which Fig. 1 is an elevation view, partially in section, showing a soldering pot embodying my invention; Fig. 2 is a plan view of Fig. 1; while Fig. 3 is a diagrammatic view showing the connections for the energizing coils.

In accordance with one form of my invention the soldering pot 10 comprises a U-shaped tubular member or pipe 11 made of a suitable magnetic material, such as iron or steel and forming a container for the soldering bath 11ª. This tubular member is shown as comprising two parallel upright sections 12, only one of which is shown, which have their lower ends connected by a U-shaped connection 13, having a smaller diameter. Although only half of the soldering pot comprising one upright section 12 is shown in detail in the drawing, it will be understood that the other half of the pot is constructed in a similar manner. Extending centrally of each section 12 is a smaller pipe 14 which is secured at its lower end in the connecting member 13. In the arrangement shown in the drawing standard pipe fittings are used. A reducing coupling 15 is secured to the lower end of section 12 and the lower end of pipe 14 is threaded and screwed into coupling 15 whereby pipe 14 is secured central of section 12. The lower end of pipe 14 also extends downward through the coupling 15 and serves as a nipple connecting elbow 16, forming a part of connecting member 13, to coupling 15. Elbow 16 is in turn connected through a short horizontal pipe 17 to a second elbow 16' forming a part of the other half of the apparatus. The pipe 14 extends upward somewhat over half the length of section 12 and is normally immersed in the soldering bath 11ª, as shown in the drawing.

Slidably mounted in the pipe 14 is a plunger or float 18 bearing on its upper end a suitable shield 19. The plunger 18 floats in the soldering bath and carries the shield 19 which, when not in use, projects above the soldering bath and, as is shown in the drawing, above the section 12. In the form of my invention shown in the drawing shield 19 is particularly adapted for soldering commutators on small motors. It is provided with a central bore or recess 20 adapted to receive the rotor shaft on which the commutator is mounted, and is enlarged at the top to receive the end of the commutator.

In using my invention, the end of the shaft on which the commutator is mounted, as well as the adjacent end of the commutator, is inserted in the floating shield 19, and then the commutator is depressed, carrying with it the shield, into the soldering bath. A suitable aperture 21 is provided in the lower end of pipe 14 through which the molten solder is free to flow as plunder 18 is forced downward. In this manner the parts or portions of the commutator and the lower end of the shaft to which it is either undesirable or unnecessary to apply the solder are protected by the shield 19, the solder being applied only to the desired parts. A collar 22 is provided in the upper end of pipe 14 to prevent plunger 18 from being pulled out. It will be observed that pipe 14 serves as a guide for the plunger.

The U-shaped container 11 for the solder is preferably heated by inducing currents therein by means of energizing coils 23 mounted on the sections 12. As shown in the drawing each coil 23 is wound in layers separated by layers of heat insulation 24. By using the heat insulation between the pipe 12 and the winding, the pipe may be operated at a higher temperature than the winding. Upon energization of the coils 23, a magnetic flux is set up in both the U-shaped container 11 and the solder whereby heating currents are induced therein.

As shown in Fig. 3, the energizing coils 23 may be provided with taps whereby different degrees of heat may be obtained. In Fig. 3 is shown an arrangement whereby two operating temperatures may be obtained by throwing a 3-pole, double-throw switch 25 in one position or the other. By throwing the switch in one position, as shown in Fig. 3, the two energizing coils 23 are connected in parallel across the supply source 26, while by throwing the switch 25 in its other position two of the three sections of each coil are connected in series across the supply source. The first connection obviously gives a greater degree of heat, since the entire number of turns of both coils are energized and this energization is greater than with the second connection.

As shown in the drawing, the U-shaped container 11 is mounted on a suitable base or support 27 which may be attached by suitable bolts 28 to the table 29 in a convenient position. The container is secured to the base by means of a clamping strap 30. The sections 12 and the coils 23 are preferably encased in a layer 31 of suitable heat insulating material. The top of the pot is sealed flush with the ends of sections 12 by a layer 32 of suitable heat insulating material, such as plaster Paris.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is,—

1. A soldering pot comprising a container, a soldering bath in said container, and a shield for a portion of the article to be soldered buoyantly supported by said bath, said shield being adapted to be depressed into said bath so as to effect the application of the solder to the desired parts of the article and protect the portion within the shield.

2. A soldering pot comprising a container, a soldering bath in said container, a float supported in said bath, a guide for said float, and a shield carried by said float adapted to receive a portion of the article to be soldered.

3. A soldering pot comprising a container, a soldering bath in said container, an upright tubular guide member in said container, a plunger fitting in said guide floating in said soldering bath, and a shield carried by said plunger adapted to receive a portion of the article to be soldered.

4. A soldering pot comprising a U-shaped container, an energizing coil on said container for inducing heating current therein, a soldering bath in said container, and a shield for a portion of the article to be soldered in each arm of said container buoyantly supported by said bath.

In witness whereof, I have hereunto set my hand this twenty-fourth day of March, 1923.

WENDELL L. MARTIN.